United States Patent
Sasaki et al.

[11] Patent Number: 5,875,157
[45] Date of Patent: Feb. 23, 1999

[54] TRACKING ERROR DETECTING CIRCUIT IN DISC-SHAPED RECORDING MEDIUM REPRODUCING AND RECORDING APPARATUS

[75] Inventors: Yasuo Sasaki, Kanagawa; Kenji Araki, Chiba, both of Japan

[73] Assignee: Sony Corporation, Tokyo, Japan

[21] Appl. No.: 815,914

[22] Filed: Mar. 13, 1997

[30] Foreign Application Priority Data

Mar. 18, 1996 [JP] Japan .................................... 8-061396
Mar. 26, 1996 [JP] Japan .................................... 8-070045

[51] Int. Cl.⁶ .................................................... G11B 7/00
[52] U.S. Cl. .................................. 369/44.29; 369/44.35; 369/44.41; 369/44.26
[58] Field of Search ............................ 369/44.29, 44.27, 369/44.41, 44.42, 44.32, 44.26, 44.34, 44.35

[56] References Cited

U.S. PATENT DOCUMENTS

| | | | |
|---|---|---|---|
| 4,866,688 | 9/1989 | Ohtake et al. ........................ | 369/44.28 |
| 5,138,592 | 8/1992 | Fujita .................................... | 369/44.37 |
| 5,434,834 | 7/1995 | Shinoda et al. ...................... | 369/44.32 |
| 5,537,373 | 7/1996 | Horikiri ................................ | 369/44.29 |
| 5,708,636 | 1/1998 | Takahashi et al. ................... | 369/44.26 |
| 5,715,217 | 2/1998 | Fuji ...................................... | 369/44.26 |

*Primary Examiner*—Nabil Hindi
*Attorney, Agent, or Firm*—Frommer Lawrence & Haug, LLP; William S. Frommer

[57] ABSTRACT

A tracking error detecting circuit including a light receiving unit divided into a plurality of light receiving sensors; a push-pull signal detecting circuit detecting the push-pull signal based on the difference of the amount of the reflected light received by the sensors; a compulsory offset cancellation circuit for removing the input offset signal from the detected push-pull signal; an offset component detecting circuit for detecting an offset component in accordance with the push-pull signal based on an amplitude of the wobbling component of the groove; a cancellation signal detecting circuit for finding an offset cancellation signal with respect to the push-pull signal an offset cancellation circuit for finding a tracking error signal by removing the offset cancellation signal from the push-pull signal; and a parameter determining means for determining the parameter to be referred to at the cancellation signal detecting circuit based on an offset component detected at the offset component detecting circuit by the movement of an optical pick-up and the offset signal input to the compulsory offset cancellation circuit for suitably removing this offset component from the push-pull signal.

16 Claims, 9 Drawing Sheets

TRACKING ERROR DETECTING CIRCUIT IN DISC-SHAPED RECORDING MEDIUM REPRODUCING AND RECORDING APPARATUS

BACKGROUND OF THE INVENTION

1. Field of the Invention

The present invention relates to a tracking error detecting circuit which is applied to a data recording and reproducing apparatus for recording and/or reproducing data with respect to a disc-shaped optical recording medium, for example, an optical disc, magneto-optical disc, or phase change optical disc, and detecting the tracking error for tracking on the disc-shaped recording medium.

2. Description of the Related Art

In a recording and reproducing apparatus for performing recording and/or reproduction with respect to a so-called optical disc such as a compact disc (CD) or Mini Disc (MD), the main tracking servo method used for suitably following a track has been the three-spot system of comparing the amounts of the reflected light from two sub-beams arranged sandwiching a main beam.

From the viewpoints of the simplification of the apparatus, reduction of size, and reliability, however, attention has been paid to the "push-pull" method with which a tracking error can be detected by a single spot. The push-pull method is a method which makes use of the fact that the distribution of the intensity of light refracted and reflected by a pit or a groove and striking an object lens again changes according to the relative position of the spot with the pit or groove. It receives the reflected light at a photo detector divided into a plurality of sections and finds the tracking error based on the difference of the amount of the light received at the sections of the photo detector.

In this push-pull method, however, it suffers from the disadvantage in that, when the object lens moves, the spot moves on the photo detector and a DC offset is caused in the tracking error signal. This DC offset is caused when use is made of a pick-up having a configuration where only the object lens moves or where the disc surface is inclined 90 degrees relative to the light axis of the beam etc. Therefore, where the push-pull method is used, it is necessary to cancel this DC offset.

Where tracking is performed with respect disc in which a "wobble" groove is formed, the method enabling the tracking error to be suitably detected by cancelling such a DC offset that is frequently used is the wobble push-pull (WPP) method.

This WPP method is a method effective where the tracking servo is applied to a disc-shaped recording medium in which a wobble groove (meandering track) is formed in the track and utilizes the fact that the amplitude of the wobble frequency component contained in the output signal of the photo detector changes according to the position of the object lens. Namely, the amplitude of the wobble frequency component contained in the light detection signal is detected, the position of the object lens is found, and the offset value caused in the tracking error is cancelled.

The tracking error signal TE detected by this WPP method is represented by for example following Equation 1.

$$TE = (E-F)/(E+F) - K_w \times (Ew-Fw)/(E-F)w \quad (1)$$

where,

E is first order diffraction light,

F is minus (−) first order diffraction light, and

Ew, Fw, and (E−F)w are wobble amplitude components of E, F, and (E−F).

In Equation 1, the first term on the right side corresponds to the push-pull signal, and the second term corresponds to the offset signal to be cancelled. Further, the coefficient $K_w$ for finding the offset signal to be cancelled is set to a predetermined value in advance based on the characteristics of the disc of the recording medium, characteristics of the optical pick-up, characteristics of the circuit, etc. and after further considering also the variation of them at production.

In this way, the coefficient $K_w$ for finding the offset cancellation value is set based on the average characteristics of the produced plurality of recording media and recording and reproducing apparatuses so that it can also handle variations of the recording media and recording and reproducing apparatuses. However, this means that, when viewing the individual recording and reproducing apparatuses and recording media mounted in the recording and reproducing apparatuses, the coefficient $K_w$ optimum for the tracking conditions thereof has not been determined. For this reason, there has arisen a demand that the offset cancellation value be sought with a higher precision by using a more suitable coefficient $K_w$.

Further, it is considered that various characteristics of the recording and reproducing apparatuses and the recording media for determining the coefficient $K_w$ gradually change along with use or along with the elapse of time, for example, aging of the characteristics of the circuit and deterioration of the laser output of the optical pick-up. For this reason, it also suffers from the disadvantage that even a coefficient $K_w$ which was substantially suitable when the recording and reproducing apparatus and recording medium were produced will deviate along with the elapse of time and it will become impossible to find an adequate offset value.

The detecting circuit of such a tracking error signal is constituted while being integrated in an RF-IC for processing the RF signal from the head in many cases. The coefficient $K_w$ as mentioned before could not be easily changed.

Further, due to the rise of recording densities and the rise of access speeds in recent years, a higher precision of tracking has been required. For this reason, it has been demanded that the offset value caused in the tracking error signal be correctly found and suitably cancelled and a correct tracking error signal be found.

Further, the offset component cancellation amount sought by for example $K_w \times (Ew-Fw)/(E-F)w$ based on the wobble component changes in the amount detected according to the direction of lens shift so it suffers from the disadvantage that a difference from the offset amount produced in an actual push-pull signal PP(E−F)(E+F) is caused due to this, the offset amount cannot be correctly found, and, as a result, a correct tracking error signal cannot be obtained.

The dependency of the push-pull signal indicated by (E−F)/(E+F) with respect to the direction of the lens shift becomes symmetrical with respect to the lens shift 0 as indicated by d in FIG. 1. Namely, in FIG. 1, y1 is almost equal to y2. No matter in which direction of the lens shifts, an amount of offset not according to that direction, but depending upon the amount of shift thereof is produced.

On the other hand, the wobble component obtained from the light detection signal has a characteristic as shown in FIG. 2. Curve a in FIG. 2 shows the dependency of the wobble component Ew/(E−F)w corresponding to the first term of the offset component as indicated as Kw×(Ew−Fw)(E−F)W upon the lens shift; and curve e shows the dependency of the wobble component (Fw/(E−F)w corresponding to the second term thereof upon the lens shift. When the offset component is found as indicated by Kw×(Ew−Fw)/(E−F)w from two signals having different dependencies with respect to the lens shift, a signal is given where the offset component is dependent on the direction of the lens shift as shown in FIG. 3. Namely, in FIG. 3, y3>>y4. Even if the shift amount is the same, a large difference is caused in the offset component calculated according to the direction of the lens shift.

As apparent from a comparison of FIG. 1 and FIG. 3 in this way, where a lens shift is carried out in a minus(−) direction in FIG. 1 and FIG. 3, the offset component actually produced in the push-pull signal shown in FIG. 1 and an offset component calculated by Kw×(Ew−Fw)/(E−F)w shown in FIG. 3 are greatly different, that is, a correct offset component cannot be calculated in that case. As a result, there arises a problem in that the correct tracking error signal cannot be obtained.

SUMMARY OF THE INVENTION

An object of the present invention is to provide a tracking error detecting circuit in which a parameter optimum for the tracking condition thereof is determined based on characteristics of the individual recording media and recording apparatuses so the offset value caused in the tracking error signal can be suitably found and cancelled.

Another object of the present invention is to provide a tracking error detecting circuit with which the offset component is correctly detected and the tracking error signal can be more precisely detected by considering also the dependency with respect to the lens shift similar to the actual case.

According to the present invention, there is provided a tracking error detecting circuit for receiving a reflected light of a spot of a beam irradiated to a disc-shaped recording medium in which a wobbled groove is formed and detecting the tracking error, comprising a light receiving unit divided into a plurality of light receiving sensors in correspondence with the track direction of the disc-shaped recording medium and receiving the light beam reflected by the disc-shaped recording medium a push-pull signal detecting circuit detecting the push-pull signal based on the difference of the amount of the reflected light received by the sensors based on the light detection signal in accordance with the amount of light received at the light receiving unit a compulsory offset cancellation circuit for removing the input offset signal from the detected push-pull signal an offset component detecting circuit for detecting an offset component in accordance with the push-pull signal based on an amplitude of the wobbling component of the groove contained in the reflected light received at the sensors a cancellation signal detecting circuit for finding an offset cancellation signal with respect to the push-pull signal by referring to a parameter determined in advance based on the detected offset component an offset cancellation circuit for finding a tracking error signal by removing the offset cancellation signal from the push-pull signal; and a parameter determining means for determining the parameter to be referred to at the cancellation signal detecting circuit based on an offset component detected at the offset component detecting circuit by the movement of an optical pick-up and the offset signal input to the compulsory offset cancellation circuit for suitably removing this offset component from the push-pull signal.

Preferably, the light receiving unit is divided into four light receiving sensors by a dividing line parallel to the track direction.

Preferably, the push-pull signal detecting circuit divides the four light receiving sensors into two sets sandwiching the groove therebetween and detects the push-pull signal based on the difference of the amount of the reflected light received by these two sets of light receiving sensors.

More Preferably, the tracking error detecting circuit finds a tracking error signal TEw by:

$$TEw=((A+B)-(C+D))/(A+B+C+D)-Kw*(Aw-Dw)/(A-D)w$$

where, the detected outputs of the four light receiving sensors are A, B, C, and D.

The detected outputs of the light receiving sensors located on the two ends sandwiching the groove among the four light receiving sensors are A and D. The wobble amplitude components of the two sides of the groove are Aw and Dw. The wobble amplitude component of the push-pull signal of the detected outputs A and D is (A−D)w and the parameter coefficient is Kw.

Preferably, the second tracking error detecting circuit further comprises a second tracking error detecting circuit which finds a tracking error signal in which the offset component is cancelled based on the tracking error offset value at an instant when a tracking servo obtained from the light detection signal is turned on in an off-track state where the tracking is performed with respect to a track in which a wobble groove is formed; a third tracking error detecting circuit for finding a tracking error signal in which the offset component is cancelled based on the amplitude of a peak value of the light detection signal where the tracking is performed with respect to a track in which a pit is formed; and a switching circuit for selecting the second and third tracking error detecting circuits and switching the same based on the track to be tracked.

Preferably, the second tracking error detecting circuit and the third tracking error detecting circuit are constituted on the same integrated circuit.

More preferably, the tracking error detecting circuit further comprises: a pit tracking error detecting circuit for finding a tracking error signal in which the offset component is cancelled based on the amplitude of the peak value of the light detection signal where the tracking is performed with respect to a track in which a pit is formed and a switching circuit for selecting the pit tracking error detecting circuit and switching the same when the object of the tracking is a pit train.

The pit tracking error detecting circuit is constituted on the same integrated circuit.

According to the present invention, there is also provided a tracking error detecting circuit for receiving a reflected light of a spot of a beam irradiated to a disc-shaped recording medium in which a wobbled groove is formed and detecting the tracking error, comprising: a light receiving unit divided into a plurality of light receiving sensors in correspondence to the track direction of the disc-shaped recording medium and receiving the light beam reflected by the disc-shaped recording medium; a push-pull signal detecting circuit detecting a push-pull signal based on the difference of the amount of the reflected light received by the sensors based on the light detection signal in accordance with the amount of light received at the light receiving unit; an offset component detecting circuit for detecting an offset component in accordance with the push-pull signal based on an amplitude of the wobbling component of the groove contained in the reflected light received at the sensors; a cancellation signal detecting circuit for finding an offset cancellation signal with respect to the push-pull signal by referring to parameters determined in advance based on the detected offset component; an offset cancellation circuit for finding a tracking error signal by removing the offset cancellation signal from the push-pull signal; and a setting means for setting the value of the parameters based on an offset component.

According to the present invention, there is further provided a tracking error detecting means for receiving a reflected light of a spot of a beam irradiated to a disc-shaped recording medium in which a wobble groove is formed and detecting the tracking error, comprising: a detecting means for detecting the reflected light from two directions sandwiching the groove; a push-pull signal detecting circuit for finding a push-pull signal based on the detection output by the detecting means; an amplitude component detecting circuit for detecting a wobbling amplitude component of the groove contained in each of the reflected lights from the two directions sandwiching the groove; an offset component detecting circuit for correcting a difference of dependency of the detected two amplitude components with respect to the shift direction of the light beam and detecting the offset component contained in the detected signals of reflected lights from the two directions based on this corrected amplitude component; and an offset signal cancellation circuit for finding the tracking error signal by removing the detected offset component from the push-pull signal.

Preferably, the offset component detecting circuit comprises: a first amplitude component detecting circuit for detecting wobbling amplitude components Ew and Fw of the groove contained in the detection signals E and F of the reflected lights from two directions sandwiching the groove; a coefficient multiplying circuit for multiplying predetermined coefficients Ke and Kf with the detected amplitude components Ew and Fw; a first subtraction circuit for finding the difference (Ke·Ew−Kf· Fw) between two amplitude components Ke·Ew and Kf·Fw multiplied by the coefficients; a second subtraction circuit for finding the difference (E−F) of the detection signals E and F; a second amplitude component detecting circuit for detecting the wobbling amplitude component (E−F)w of the groove contained in the E−F; and a division circuit for performing the division by using the difference Ke·Ew−Kf·Fw found at the first subtraction circuit as the dividend and the amplitude component (E−F)w detected at the second amplitude component detecting circuit as the divisor, the offset component PPo being calculated by an equation PPo=(Ke·Fw−Kf·Fw)/(E−F)w.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

An embodiment of a tracking error detecting circuit of the present invention will be explained with reference to FIG. 4 to FIG. 8.

In the present embodiment, the explanation will be made of a tracking error detecting circuit applied to an optical disc apparatus which operates as a recording and reproducing apparatus which can perform processing with respect to an optical disc in which wobble grooves and pit information are formed and can perform recording or reproduction.

Figure 4:
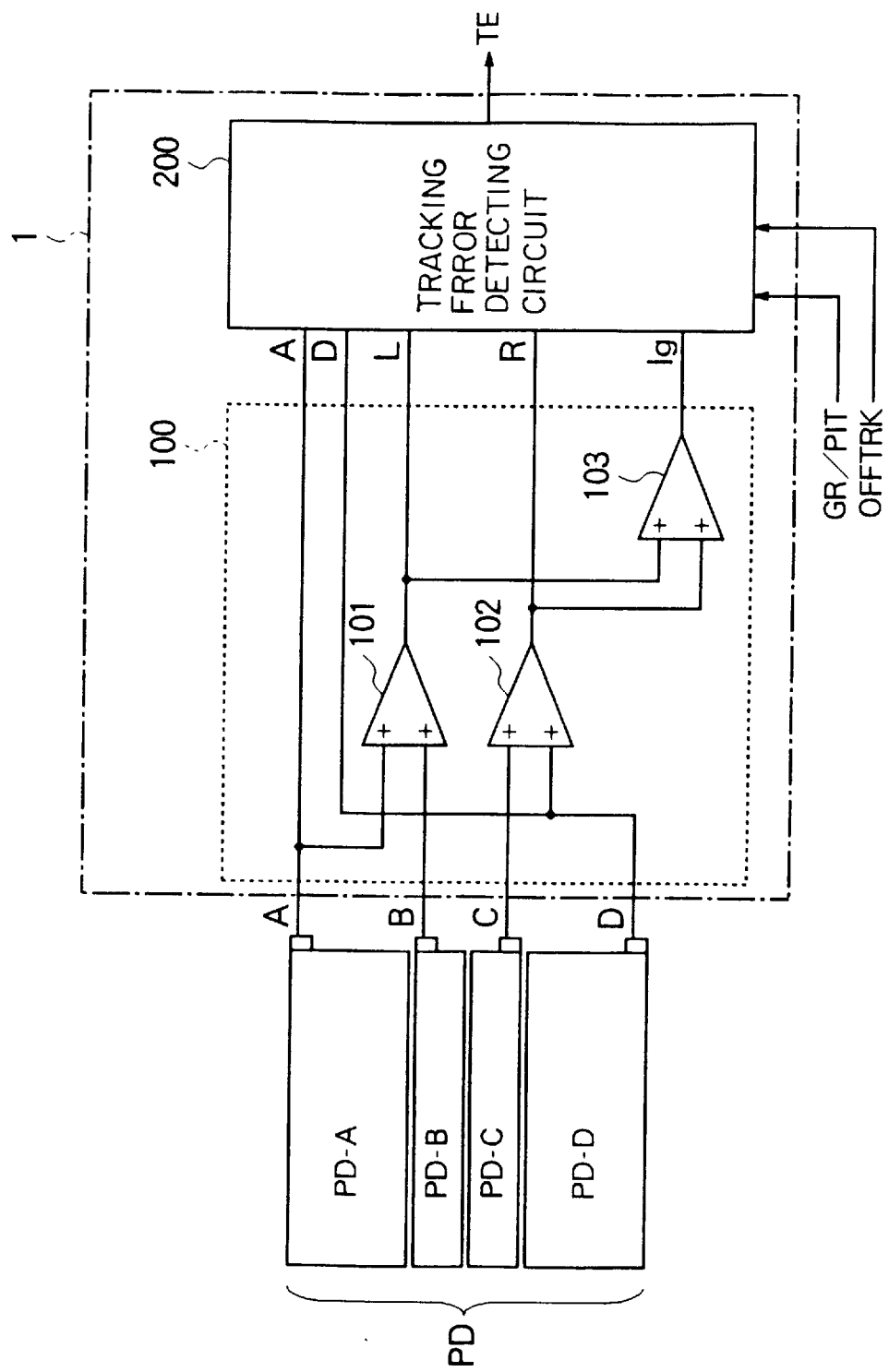
FIG. 4 is a block diagram of circuit for the detection of a tracking error detecting of an optical disc apparatus according to one embodiment of the present invention.

FIG. 4 is a block diagram of a circuit for the detection of the tracking error of such an optical disc apparatus.

As shown in FIG. 4, the detection of the tracking error is carried out mainly by a photo detector PD, a signal synthesizing unit 100, and a tracking error detecting unit 200.

Note that, in this embodiment, the signal synthesizing unit 100 and the tracking error detecting unit 200 are integrally constituted together with other circuits in an ratio-frequency integration circuit (RF-IC) in which circuits for performing the processing of the RF signal are integrated.

Figure 7:
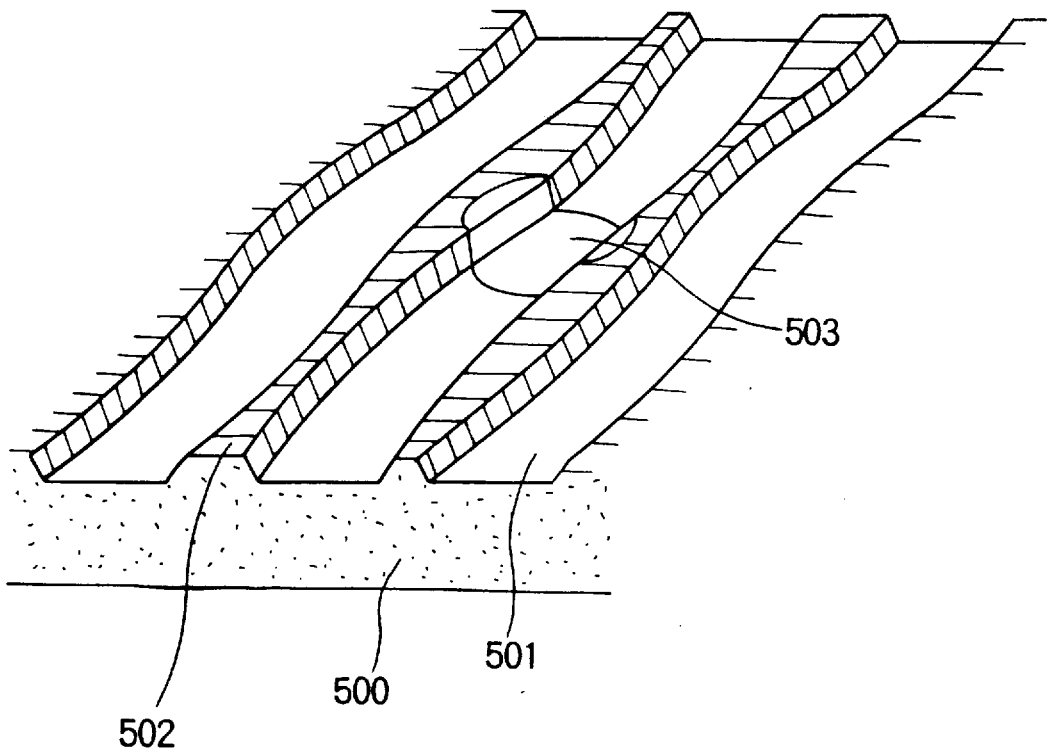
FIG. 7 is a view of an example of the recording medium which is processed by the optical disc apparatus of the present embodiment.

Further, a user recording region of the optical disc which is being recorded on and/or reproduced from in the present embodiment is constituted by a track in which a meandering guide groove as shown in FIG. 7 is formed. In FIG. 7, a pre-groove 501 corresponding to a groove portion and a land 502 corresponding to a land portion are formed, and an edge portion thereof meanders at a predetermined cycle. Then, a spot 503 follows this pre-groove 501 to perform the recording and/or reproduction of the data. In the present embodiment, hereinafter, such a data track will be referred to as a wobble track.

On an inner circumferential side of this optical disc, there is a control information region in which the control information is recorded. The data is recorded by the pits in this region.

Further, the track formed by the pit train applied to the control information region of the optical disc used in the optical disc apparatus of the present embodiment and the data track will be referred to as pit tracks below.

First, an explanation will be made of the configuration of each portion involved in the detection of the tracking error of the optical disc device.

The photo detector PD is provided in a not illustrated optical pick-up (OP), detects the light diffracted and reflected at the recording medium, and outputs the signals A to D in accordance with the light amounts thereof. As the photo detector PD of the present embodiment, a four-section (division) photo detector PD is used comprised of the four photo detector sections PD-A to PD-D are arranged as illustrated. Here, PD-A to PD-D are divided by lines in parallel to the track direction. Among the four photo detector sections PD-A to PD-D, the two photo detector sections PD-A and PD-B detect the first order diffraction light reflected to the left side of the data track, and the remaining two photo detector sections PD-C and PD-D detect the minus first order diffraction light reflected to the right side of the data track.

The signal synthesizing unit 100 generates a desired signal suited to be input to the tracking error detecting unit 200 mentioned later based on the signal output from the photo detector PD. The signal synthesizing unit 100 of the present embodiment has three adders 101 to 103. First, in the first adder 101, the output signal A from the photo detector section PD-A and the output signal B from the photo detector section PD-B are added, and an output signal L (=A+B) corresponding to the light amount of the full first order diffraction light is generated. The second adder 102 adds the output signal C from the photo detector section PD-C and the output signal D from the photo detector section PD-D and generates an output signal R (=C+D) corresponding to the light amount of the full minus first order diffraction light. Also, the third adder 103 further adds the outputs of the first adder 101 and the second adder 102 and outputs an output signal Ig (=A+B+C+D) corresponding to the whole light amount detected at the photo detector sections PD-A to PD-D.

The tracking error detecting unit 200 is a circuit for detecting tracking error by the push-pull method. The tracking error detecting unit 200 detects the tracking error TE based on a signal input via the signal synthesizing unit 100.

A detailed explanation will be made of the configuration of the tracking error detecting unit 200 by referring to FIG. 5.

The tracking error detecting unit 200 has three tracking error detecting circuits, a WPP unit 210, a track on unit 230, a TPP unit 250, and switching circuits 271 and 272.

The WPP unit 210 is a tracking error detecting circuit of the present invention. It is a tracking error detecting circuit which processes the wobble track as shown in FIG. 7 and which is made substantially valid particularly at the time of an on-track state.

The WPP unit 210 is constituted by an offset value detecting circuit comprising a first wobble amplitude detecting unit 211 to a holding means 218, a push-pull signal detecting circuit comprising a subtracter 219 to a divider 220, and an offset cancellation circuit comprising a switching unit 221 and a subtracter 222.

The WPP unit 210 receives as input the output signal A of the photo detector section PD-A, the output signal D of the photo detector section PD-D, the output signal L of the adder 101, the output signal R of the adder 102, and the output signal Ig of the adder 103. Then, particularly at the time of the offset detecting circuit adjustment mode, a compulsory offset cancellation signal $k_{ppo}$ and a coefficient adjustment signal $k_w$ in the coefficient multiplier 217 are input from an external portion of the RF-1C1 and the detected cancellation value held in the holding means 218 is output to the external portion.

First, an explanation will be made of the configuration of the offset value detecting circuit.

The first wobble amplitude detecting unit 211 detects the amplitude signal Aw of wobble on the photo detector section PD-A side (left side) from the output signal A of the photo detector section PD-A.

Figure 6:
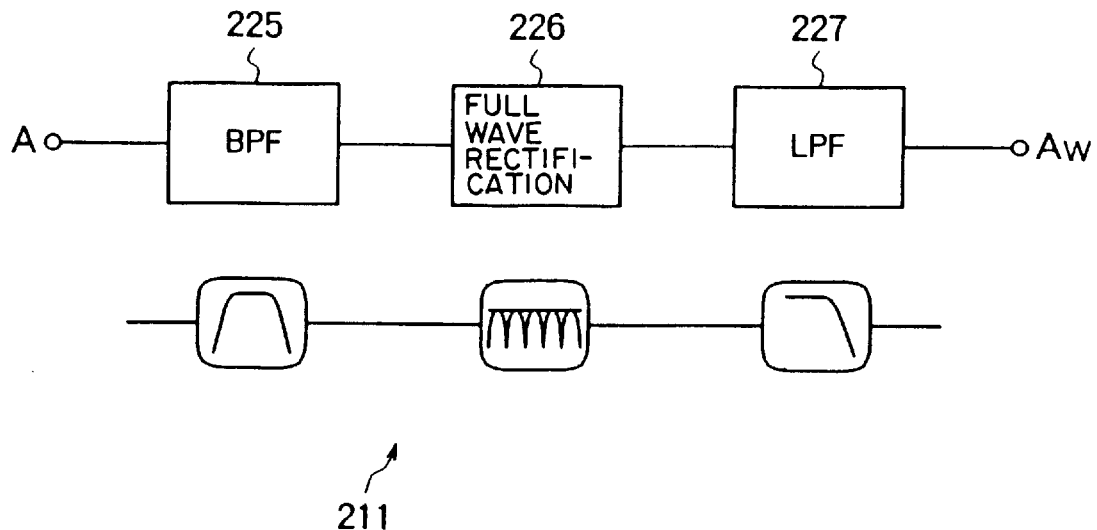
FIG. 6 is a block diagram of a wobble amplitude detecting unit of a WPP unit of the tracking error detecting unit shown in FIG. 5.

The configuration of this first wobble amplitude detecting unit 211 is shown in FIG. 6.

The first wobble amplitude detecting unit 211 has a band pass filter 225, a full wave rectifier 226, and a low pass filter 227.

In the first wobble amplitude detecting unit 211, the input signal A is band-restricted at the band pass filter 225, rectified at the full-wave rectifier 226, and then made to pass through the low pass filter 227 to detect the amplitude of the signal A.

The second wobble amplitude detecting unit 212 detects the amplitude signal Dw of wobble on the photo detector section PD-D side (right side) from the output signal D of the photo detector section PD-D in the same way as the first wobble amplitude detecting unit 211. The configuration and operation of the second wobble amplitude detecting unit 212 are the same as the configuration and operation of the first wobble amplitude detecting unit 211 mentioned before by referring to FIG. 6.

The subtracter 213 finds the meander difference Aw−Dw between the amplitude component Aw of the left side wobble detected at the first wobble amplitude detecting unit 211 and the amplitude component Dw of the right side wobble detected at the second wobble amplitude detecting unit 212 and outputs the difference to the divider 216.

Further, in the subtracter 214, a difference between the output signal A from the photo detector section PD-A and the output signal D from the photo detector section PD-D is found and the difference (AD) thereof is output to the third wobble amplitude detecting unit 215.

The third wobble amplitude detecting unit 215 detects the amplitude signal (A−D)w of wobble in the input push-pull signal (A−D) and outputs the same to the divider 216. The configuration and operation of this third wobble amplitude detecting unit 215 are also the same as the configuration and operation of the first wobble amplitude detecting unit 211 mentioned before.

The divider 216 performs the division shown in the following Equation 2 by defining the signal Aw−Dw input from the subtracter 213 as the dividend and the signal (A−D)w input from the third wobble amplitude detecting unit 215 as the divisor and outputs the result thereof to the coefficient multiplier 217.

$$(Aw-Dw)/(A-D)w \qquad (2)$$

Then, in the coefficient multiplier 217, as shown in the following Equation 3, the result of division in the divider 216 is multiplied by a predetermined coefficient to thereby obtain the cancellation value of the tracking error signal. This coefficient $K_w$ is determined by a not illustrated control unit and adjusted and determined according to a coefficient adjustment signal $k_w$ input from the outside.

$$K_w \times (Aw-Dw)/(A-D)w \qquad (3)$$

The holding means 218 holds the cancellation value obtained in the coefficient multiplier 217 and supplies this to the subtracter 222 via the switching unit 221. Further, the cancellation value of the output of the holding means 218 is referred to as the detection cancellation signal CSL from the outside in the offset detection circuit adjustment mode. The not illustrated control unit detects the coefficient $K_w$ as the optimum value based on this detection cancellation signal CSL.

Next, an explanation will be made of the configuration of the push-pull signal detecting circuit.

The subtracter 219 finds the difference between the output signal L corresponding to the amount of the full first order diffraction light and the output signal R corresponding to the amount of the full minus first order diffraction light and outputs the result to the subtracter 223.

The subtracter 223 removes the offset component from the push-pull signal by the signal input from the outside at the time of the offset detection circuit adjustment mode. Namely, it subtracts the compulsory offset cancellation signal $k_{ppo}$ input from the outside from the signal as the result of subtraction input from the subtracter 219 and outputs the result thereof to the divider 220. Note that, at the usual operation mode, 0 is input as the signal $k_{ppo}$, so the function of this subtracter 223 becomes substantially invalid.

The divider 220 performs the division by using the result of subtraction of the subtracter 223 as the dividend and using the output signal Ig corresponding to the input full light amount as the divisor and obtains the push-pull signal normalized by the full light amount.

Then, in the subtracter 222 as the offset cancellation circuit, the offset value held in the holding means 218 is subtracted from the push-pull signal found at the divider 220. As a result, a signal $TE_w$ as shown in the following Equation 4, which is the push-pull signal in which the offset is cancelled and corresponding to the tracking error, is obtained.

$$TE_w = (L-R)/Ig - K_w \times (Aw-Dw)/(A-D)w \qquad (4)$$

Note that, the switching unit 221 is a switch for turning ON/OFF the cancellation of the offset value in the WPP unit 210. Where the WPP unit 210 is valid and the offset value which is found at the first wobble amplitude detecting unit 211 to the coefficient multiplier 217 and stored in the holding means 218 is subtracted from the push-pull signal, the switching unit 221 selects the terminal (contact) a. Further, at the offset detection circuit adjustment mode when the track-on unit 230 mentioned later is made valid, the switching unit 221 selects the terminal (contact) b and brings the subtracted value in the subtracter 222 to zero and outputs the result of the divider 220 as it is.

The output of the WPP unit 210 is output to the track-on unit 230 and the terminal a of the switching circuit 271.

The track-on unit 230 is a tracking error detecting circuit for supplementing the operation of the WPP unit 210. Namely, this is a circuit for outputting the tracking error in place of the WPP unit 210 when a recording medium in which a wobble is provided in a data track similar to the WPP unit 210 is regarded as the object of processing and when the WPP unit 210 is not valid since the tracking servo has not been applied or immediately after the tracking servo is applied.

The track-on unit 230 has a peak hold unit 231, a bottom hold unit 232, an intermediate value operation unit 233, a holding means 234, and a subtracter 235.

Note that, a signal controlling the ON/OFF state of the not illustrated tracking servo is input to the track-on unit 230, which operates based on this signal.

The peak hold unit 231 and the bottom hold unit 232 hold the peak value and bottom value immediately after for example a track jump and at an instant when the tracking servo becomes ON.

The intermediate operation unit 233 calculates the intermediate value of the peak value held in the peak hold unit 231 and the bottom value held in the bottom hold unit 232 and holds the same as the offset value of the tracking error signal in the holding means 234.

Then, in the subtracter 235, the offset value held in the holding means 234 is subtracted from the tracking error signal output from the WPP unit 210. As a result, a signal $TE_R$ which is the push-pull signal in which the offset is cancelled and corresponding to the tracking error is obtained.

The output of the track-on unit 230 is output to the terminal b of the switching circuit 271.

The TPP unit 250 is a circuit for outputting a tracking error when a pit track is regarded as the object of the reading processing.

An explanation will be made of the TPP (TOP-HOLD PUSH PULL) method by referring to FIG. 8.

Figure 8:
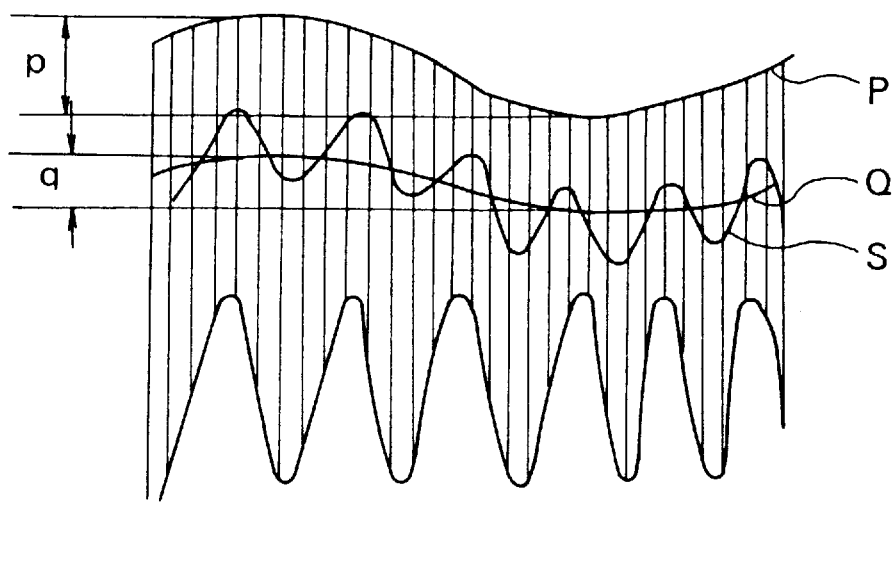
FIG. 8 is a waveform diagram for explaining the method of the offset cancellation in a top-hold push pull (TPP) unit of the tracking error detecting unit shown in FIG. 5.

FIG. 8 is a graph of an RF envelope waveform of the signal L corresponding to the amount of the full first order diffraction light. In FIG. 8, a waveform P is a peak of the signal L, a signal S is a signal after passing the RF envelope used when applying the tracking by the push-pull system through the LPF (low pass filter), and a signal Q is a waveform showing the change of the offset of the signal S. In order to cancel the offset by the lens shift or the skew of the disc, the change q of the offset may be subtracted from the signal S. Namely, if a constant $K_t$ ($K_t<1$) where q becomes equal to $K_t \times p$ is determined, the signal in which the offset is cancelled is represented by $S-K_t \times p$. Accordingly, if the change p of the peak is sought, also the offset value can be obtained.

Note that, in the present embodiment, $K_t$ is made to equal to 0.8.

The TPP unit 250 performing such processing has a first peak hold circuit 251, a second peak hold circuit 254, a first coefficient multiplier 252, a second coefficient multiplier 255, and subtracters 253, 256, and 257.

The first peak hold circuit 251 holds the peak value Lp of the output signal L corresponding to the light amount of the input full first order diffraction light. This peak value is multiplied by a constant $K_t$ determined in advance in the first coefficient multiplier 252 and used as the offset signal. Then, in the subtracter 253, by further subtracting this multiplication result $K_t \times Lp$ from the output signal L corresponding to the amount of the sequentially input full first order diffraction light, the output signal corresponding to the amount of the first order diffraction light in which the offset is cancelled is obtained.

Similarly, the second peak hold circuit 254 holds the peak value Rp of the output signal R corresponding to the amount of the input full minus first order diffraction light. This peak value is multiplied by the constant $K_t$ determined in advance in the second coefficient multiplier 255 and used as the offset signal. Then, in the subtracter 256, by further subtracting this multiplication result $K_t \times Rp$ from the output signal R corresponding to the amount of the sequentially input full minus-first order diffraction light, the output signal corresponding to the amount of the minus(−) first order diffraction light in which the offset is cancelled is obtained.

Then, in the subtracter 257, a difference between the output signal corresponding to the amount of the first order diffraction light in which the offset is cancelled output from the subtracter 253 and the output signal corresponding to the amount of the minus first order diffraction light in which the offset is cancelled output from the subtracter 256 is found and is output as the tracking error signal $TE_r$ to the switching circuit 272.

The switching circuit 271 is switched based on the signal OFFTRK indicating whether or not the tracking servo is valid. Where the tracking servo is valid, the terminal a is selected and the tracking error signal $TE_w$ detected at the WPP unit 210 is output. Where the tracking servo is not valid, the terminal b is selected, and the tracking error signal $TE_R$ detected at the track on unit 230 is output.

Note that, the case where the tracking servo is valid is an on-track state, i.e., conversely, a state where the WPP unit 210 correctly operates. Further, the case where the tracking servo is not valid is a period obtained by combining the term where the tracking servo is OFF due to a track jump or the like and the term where after the tracking servo is made ON, a brake pulse or the like is generated and converged to the on-track state.

Further, in synchronization with this switching circuit 271, also the switching unit 221 of the track-on unit 230 is switched. Concretely, when the switching circuit 271 selects the terminal a and selects the tracking error signal $TE_w$ from the WPP unit 210, also the switching unit 221 selects the terminal a and makes the offset cancellation circuit of the WPP unit 210 valid, and when the switching unit 271 selects the terminal b and selects the tracking error signal $TE_R$ from the track on unit 230, the switching unit 221 selects the terminal b to input the signal in which the offset cancellation is not carried out from the WPP unit 210 to the track-on unit 230.

The switching circuit 272 is switched in accordance with the track which is processed based on the signal GR/PIT for discriminating the track to be tracked. When the track to be processed is a wobble track, the switching circuit 272 selects the terminal a so that the tracking error signals $TE_W$ and $TE_R$ from the WPP unit 210 or the track-on unit 230 are output.

Further, when the track to be processed is a pit track, it selects the terminal b so that the tracking error signal $TE_r$ from the TPP unit 250 is output.

Figure 5:
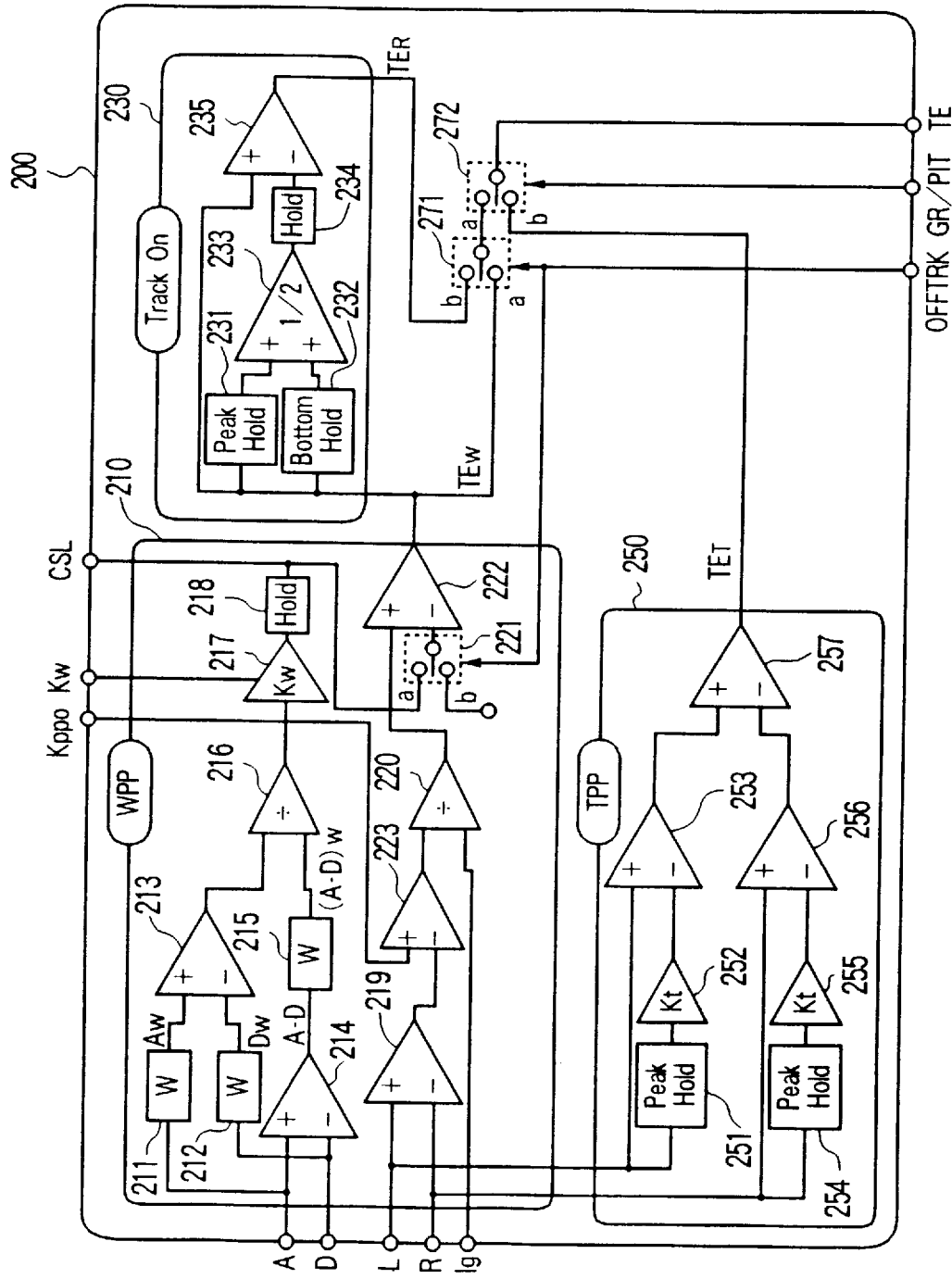
FIG. 5 is a block diagram of a tracking error detecting unit of the circuit shown in FIG. 4.

An explanation was made above of the configuration of each portion involved in the detection of the tracking error of the optical disc device of the present embodiment by referring to FIG. 4 to FIG. 6. These constituent units are controlled by the not illustrated control unit and respectively execute functions as mentioned before.

This control unit is constituted by an operational processor comprising mainly a processor, for example, a one chip microcomputer, and performs the set up and adjustment of the parameters for the constituent units, control of the operational timing of the constituent units, etc.

Particularly concerning the present invention, the control unit performs the control of the operation in the offset detection circuit adjustment mode and the operation in the usual operation mode.

The offset detection circuit adjustment mode is an operation performed together with a series of initialization operations when for example the power source of the optical disc apparatus is turned on or when the optical disc is exchanged. It is an operation for producing the offset value by moving the optical pick-up with respect to the optical disc to be recorded on and/or reproduced from and determining the coefficient $K_w$ of the offset value detecting circuit based on the offset cancellation value CSL detected at the offset value detecting circuit at that time.

Further, the normal operation mode is an operation for performing the normal tracking error detection by using the adjusted coefficient $K_w$.

Next, an explanation will be made of the operation of each unit involved in the detection of the tracking error of the optical disc device of the present embodiment.

First, the user of the optical disc apparatus performs the selection by operating the switch or sets the disc, whereby the type of the disc-shaped recording medium to be processed is detected and determined. The signal GR/PIT indicating the form of the track to be tracked is generated by the not illustrated control unit. Where a wobble track is the object of the processing, the signal GR/PIT becomes "Low". The generated track discrimination signal GR/PIT is supplied to the switching circuit 272 of the tracking error detecting unit 200. Where the signal GR/PIT is "Low", the terminal a is selected, and where the signal GR/PIT is "High", the terminal b is selected. Namely, where the track to be processed is a wobble track, the tracking error detected at the WPP unit 210 and the track-on unit 230 is output. Where it is a pit track, the tracking error detected at the TPP unit 250 is output.

When the recording medium is set, the rotation of the disc is immediately started by the control of the not illustrated control unit and the tracking servo is simultaneously applied.

First, the outputs of the left side photo detector sections PD-A and PD-B and right side photo detector sections PD-C and PD-D are added at the adder 101 and the adder 102 of the signal synthesizing unit 100, respectively, whereby the left side output signal L and the right side detection signal R are generated. These are further added at the adder 103, whereby the signal Ig corresponding to the full light amount is generated. The signals A and D output from the photo detector sections PD-A and PD-D and the generated signals L, R, and Ig are input to the tracking error detecting unit 200 and supplied for the processing for detection of the tracking error.

Below, an explanation will be made of the operation of the detection of the tracking error while dividing this case into the case where the processing object is a wobble track and the case where the processing object is a pit track.

Where the tracking is carried out with respect to a wobble track, the WPP unit 210 and the track-on unit 230 become substantially valid based on the signal GR/PIT mentioned before. Further, either of the WPP unit 210 and the track-on unit 230 is selected based on the signal OFFTRK indicating the state of tracking.

The signal OFFTRK indicating the state of tracking is a signal which becomes "Low" when the head does not follow the track (at time of off-track state) and becomes "High" when the head substantially follows the track (at time of on-track state) as mentioned before. Concretely, at the normal operation excluding the time of start and time of stop of the apparatus, the state during a period where a track jump is made and a period where a brake pulse or the like is applied after the end of the track jump and the head is substantially positioned on the desired track is the off-track state where the signal OFFTRK becomes "Low".

This signal OFFTRK is applied to the switching unit 221 and the switching circuit 271 of the tracking error detecting unit 200. When the signal OFFTRK is "Low", the terminal b is selected, and when the signal OFFTRK is "High", the terminal a is selected.

Where an optical disc having a wobble track is set, the difference between the signal L from the left side photo detector sections PD-A and PD-B and the signal R from the right side photo detector sections PD-C and PD-D is found at the subtracter 219 of the tracking error detecting unit 200 and the push-pull signal is generated. Further, the result thereof is divided at the divider 220 by using the signal Ig as the divisor and normalized, thus the tracking error signal before cancellation of the offset is found.

When the signal OFFTRK is "High" and the pick-up is on track, the offset value is found by the circuits of first wobble amplitude detecting unit 211 to the holding means 218.

First, the amplitude components Aw and Dw of the wobble are respectively found from the signal A from the left outside photo detector section PD-A and the signal D from the right outside photo detector section PD-D at the first wobble amplitude detecting unit 211 and the second wobble amplitude detecting unit 212, and further the difference Aw−Dw of the amplitude components is found at the subtracter 213.

Further, the difference of the signal A and signal D is found at the subtracter 214, and the amplitude component (A−W)w of the wobble is found at the third wobble amplitude detecting unit 215 with respect to the result thereof, which is the push-pull signal.

Then, at the divider 216, (Aw−Dw)/(A−D)w is found and the result multiplied by $K_w$ at the coefficient multiplier 217, whereby the offset value based on the wobble is sought. The found offset value is stored in the holding means 218.

Then, in the subtracter 222, the offset value with respect to the original tracking error signal found at the divider 220, input via the switching unit 221 in which the terminal a is selected due to the on-track state and stored in the holding means 218, is cancelled and a tracking error $TE_W$ in which the offset value is cancelled is generated.

The generated tracking error $TE_W$ is output via the switching circuit 271 and the switching circuit 272.

Further, when the signal OFFTRK is "Low" and at pick-up is off track, the tracking error in which the offset value is cancelled is found at the track-on unit 230.

The terminal b is selected in the switching unit 221 at the time of an off-track state, so the subtraction is not carried out in the subtracter 222 and a tracking error signal in which the offset is not cancelled found at the divider 220 is output as it is to the tracking error detecting unit 200.

Further, where an optical disc in which a wobble track is formed is set and where the initial tracking state substantially becomes the on-track state, the offset detection circuit coefficient adjustment mode is entered, where the coefficient $K_W$ is determined so as to find the optimum offset cancellation value.

In the offset detection circuit coefficient adjustment mode, first the object lens of the optical pick-up is moved to cause an offset in the tracking error. This offset is cancelled by the compulsory offset cancellation signal $k_{ppo}$ input to the subtracter 223 from the outside and a correct tracking servo is secured. Then, at this time, the cancellation signal CSL which is detected at the offset value detecting circuit and held in the holding means 218 is observed and the coefficient $K_W$ is determined so that this signal CSL becomes the correct offset value.

The determined coefficient $K_W$ is immediately set in the coefficient multiplier 217. Also, the operation mode is returned to the normal operation mode. By this, the correct offset value is found after this.

In the track-on unit 230, the peak value and the bottom value at the instant when the tracking servo becomes ON are held in the peak hold unit 231 and the bottom hold unit 232 based on the signal for controlling the ON/OFF state of the not illustrated tracking servo. The intermediate value thereof is calculated at the intermediate value operation unit 233 and held as the offset value in the holding means 234.

Then, in the subtracter 235, the offset value with respect to the tracking error signal in which the offset is not cancelled, stored in the holding means 234, is cancelled, and the tracking error $TE_R$ in which the offset value is cancelled is generated. The generated tracking error TER is output via the switching circuit 271 and the switching circuit 272.

Where the tracking is carried out with respect to a pit track, the TPP unit 250 becomes substantially valid based on the signal GR/PIT mentioned before.

In the TPP unit 250, the peak values Lp and Rp of the signal L from the left side photo detector sections PD-A and PD-B and the signal R from the right side photo detector sections PD-C and PD-D are respectively detected at the first peak hold circuit 251 and the second peak hold circuit 254. The predetermined constant $K_t$ determined in advance is multiplied with these detected peak values Lp and Rp at the coefficient multipliers 252 and 255 and the offset values are found.

Next, in the subtracter 253, the offset values $K_t \times Lp$ and $K_t \times Rp$ are subtracted from the original signals L and R, and the output signals corresponding to the first order diffraction light and the minus first order diffraction light in which the offset value is cancelled are obtained.

Then, in the subtracter 257, the difference of the output signals corresponding to amounts of the first order diffraction light and the minus first order diffraction light in which the offset value is cancelled is obtained and output as the tracking error signal $TE_r$ to the switching circuit 272.

The output tracking error signal $TE_r$ is output via the switching circuit 272.

In this way, in the tracking error detecting circuit of the present embodiment, the tracking error with respect to both of a wobble track and pit track can be detected by the push-pull method using a single beam. Further, with respect to a wobble track, the WPP circuit and the track-on circuit are switched in accordance with the tracking state so that the detection of the tracking error can be suitably carried out.

Then, particularly, in the WPP circuit performing processing with respect to a wobble track, since the value of the coefficient $K_W$ for finding the offset cancellation value has been determined by the operation in the offset detection circuit adjustment mode, it can be adjusted to the value optimum for the characteristics of the recording and reproducing apparatus and the recording medium. As a result, the offset value can be correctly found and cancelled and thus the correct tracking error can be detected.

Further, the signal synthesizing unit 100 processing the signals from the photo detector sections PD-A to PD-D, the WPP unit 210, the track-on unit 230, and the ZTPP unit 250 are all integrally integrated and constituted in the RF-IC of the optical disc, therefore the mounting is easy and it is possible to greatly simplify the configuration and realize a reduction of the size of the device and a reduction of the power consumption.

Further, for the circuits after this tracking error detection, exactly the same circuits as those heretofore can be used, so the already existing devices can be modified to optical disc devices having a higher performance by just replacing their parts with the optical pick-up and the RF-IC of the present embodiment.

Note that, the present invention is not limited to the first embodiment. Various modifications are possible.

For example, the shape, arrangement, etc. of the divided sensor of the optical pick-up are not limited to the four-section photo detector PD shown in the present embodiment either. A divided sensor having any structure can be adopted. Further, for example where two sets of four-section photo detectors PD are used, the two corresponding photo detector outputs may be added to form A, B, C, and D again.

Further, the configuration of the control unit not illustrated in the present embodiment and the method of finding the coefficient $K_W$ in the offset detection circuit adjustment mode are not limited to only those shown in the present embodiment either. Any configuration and method can be adopted.

Next, an explanation will be made of a second embodiment of the present invention by referring to FIG. 9 to FIG. 12.

In the present embodiment, the explanation will be made of a tracking error detecting circuit applied to an optical disc apparatus performing the recording on and/or reproduction from a disc in which a wobble groove is formed similar to the first embodiment mentioned before, for example, a Mini Disc (MD).

Figure 11:
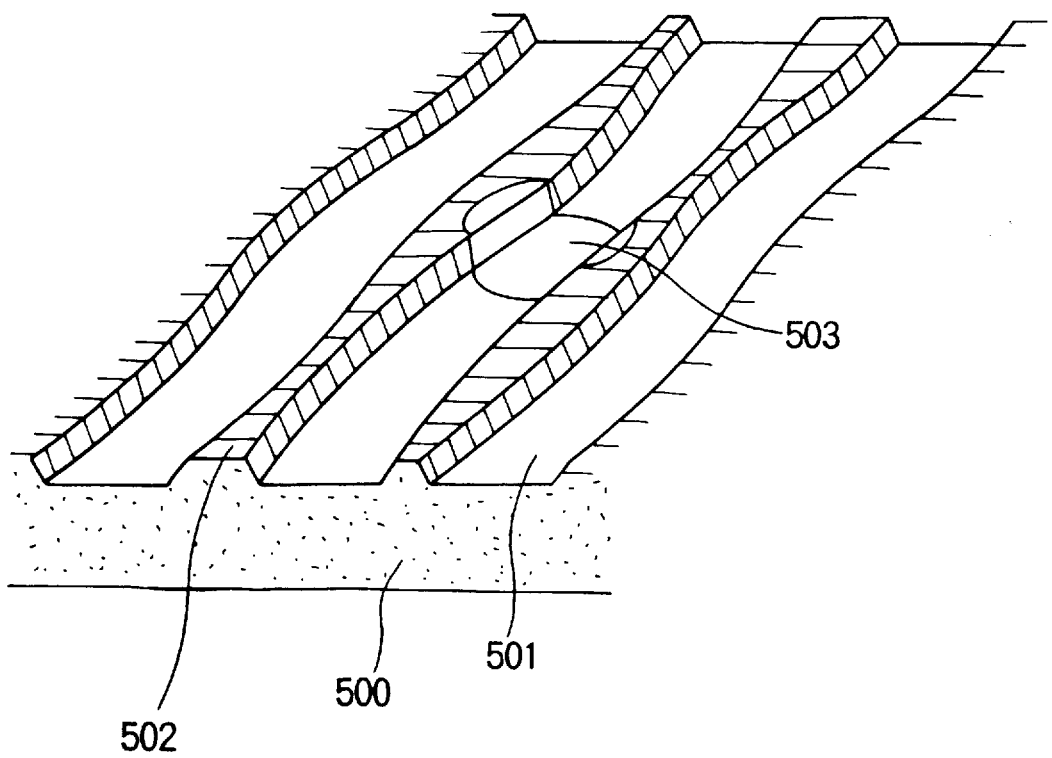
FIG. 11 is a view of a recording medium which is tracked in the tracking error detecting circuit shown in FIG. 9.

The disc to be tracked is an optical disc in which a meandering guide groove (wobble groove) is provided along the data track as shown in FIG. 11. A disc substrate 500A of this optical disc is constituted by a pre-groove 501A corresponding to the groove portion and a land 502A corresponding to the land portion. The edge portion thereof meanders at a predetermined cycle. A spot 503A follows this pre-groove 501A to perform the recording and or reproduction of the data.

Figure 9:
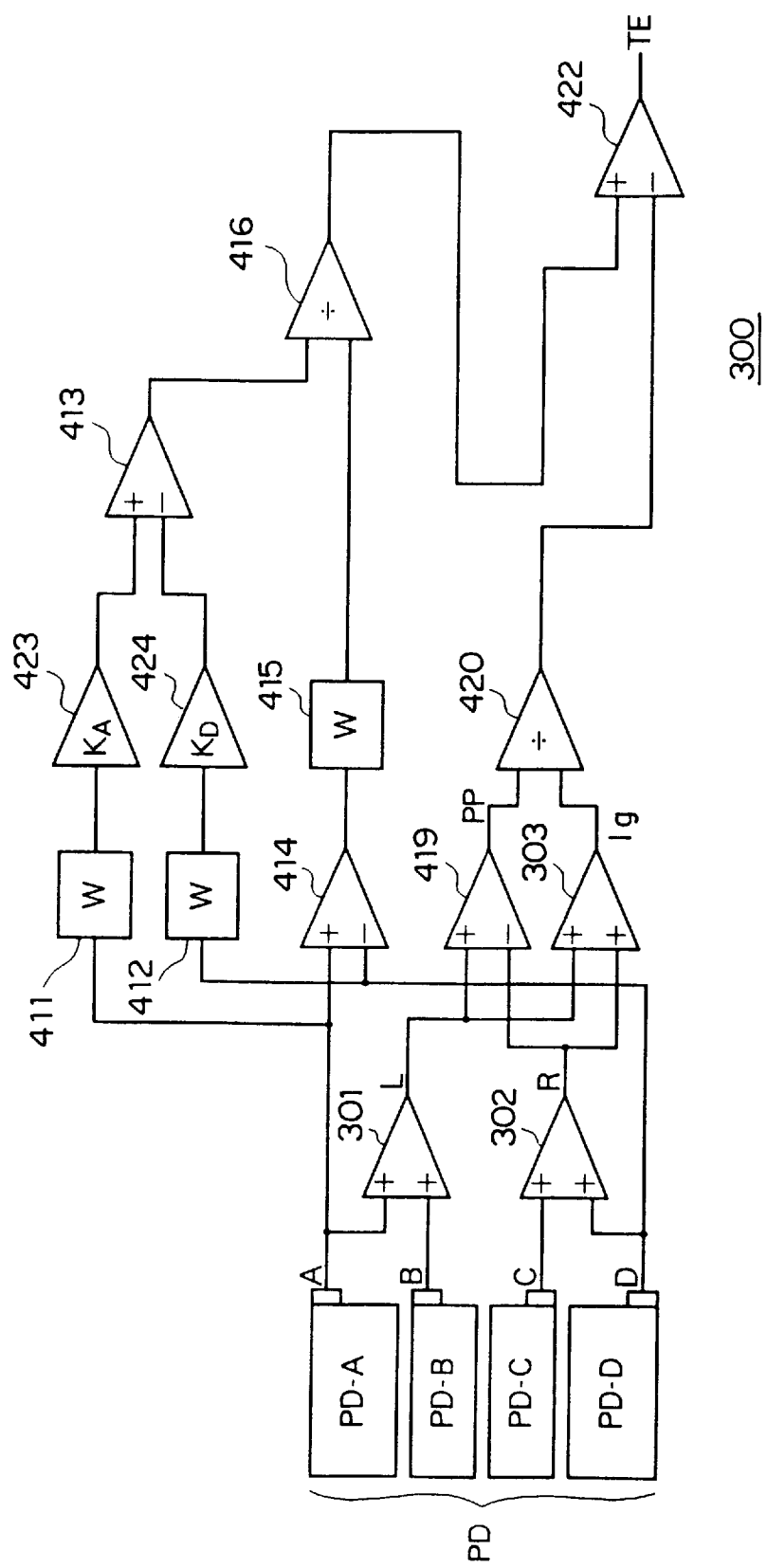
FIG. 9 is a block diagram of the configuration of a tracking error detecting circuit according to a second embodiment of the present invention.

FIG. 9 is a block diagram of the configuration of this tracking error detecting circuit.

The tracking error detecting circuit 300 is constituted by the photo detector PD, adders 301, 302, and 303, subtracters 413, 414, 419, and 422, dividers 416 and 420, wobble amplitude detecting units 411, 412, and 415, and coefficient multipliers 423 and 424 connected as illustrated.

First, an explanation will be made of the configuration of each unit.

The photo detector PD is provided in the not illustrated optical pick-up (OP), detects the light diffracted and reflected at the recording medium, and outputs the signals A to D in accordance with the light amounts thereof. As the photo detector PD of the present embodiment, a four-section (division) photo detector PD comprising four photo detector sections PD-A to PD-D arranged as illustrated is used similar to the first embodiment mentioned above. Here, this photo detector PD is given the same references since a detector common to that of the first embodiment can be used. Among the four photo detector sections PD-A to PD-D, the two photo detector sections PD-A and PD-B detect the first order diffraction light reflected to the left side of the data track, and the remaining two photo detector sections PD-C and PD-D detect the minus first order diffraction light reflected to the right side of the data track.

The first adder 301 adds the output signal A from the photo detector section PD-A and the output signal B from the photo detector section PD-B and generates the output signal L (=A+B) corresponding to the amount of the full first order diffraction light.

The second adder 302 adds the output signal C from the photo detector section PD-C and the output signal D from the photo detector section PD-D and generates the output signal Ig (=C+D) corresponding to the amount of the full minus first order diffraction light.

The third adder 303 further adds the outputs of the first adder 301 and the second adder 302 and outputs the output signal Ig (=A+B+C+D) corresponding to the full light amount detected at the photo detector sections PD-A to PD-D.

The first wobble amplitude detecting unit 411 detects the amplitude signal Aw of the wobble of the photo detector section PD-A side (left side) from the output signal A of the photo detector section PD-A.

Figure 10:
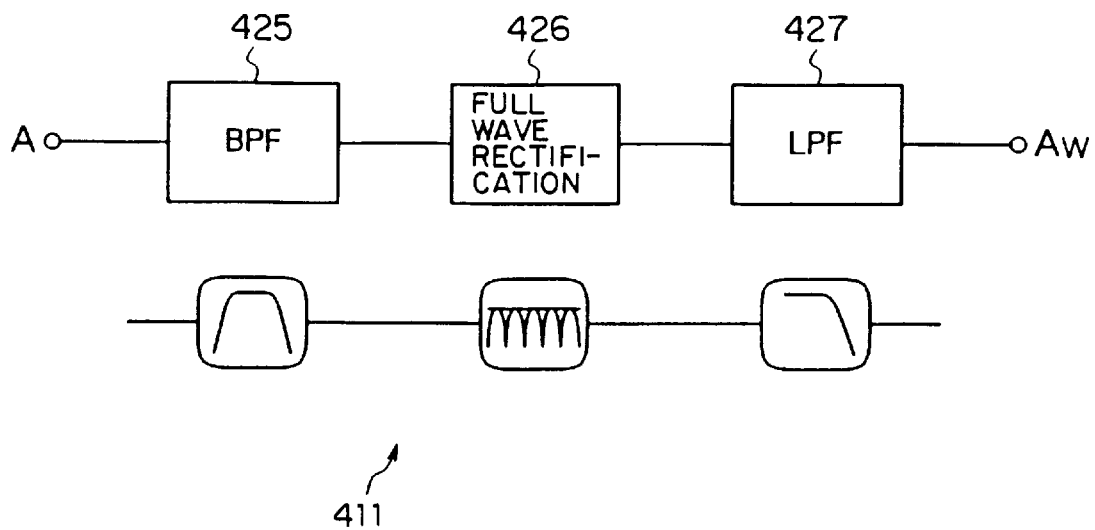
FIG. 10 is a block diagram of the configuration of a wobble amplitude detecting unit of the tracking error detecting circuit shown in FIG. 9.

The configuration of this first wobble amplitude detecting unit 411 is shown in FIG. 10.

The first wobble amplitude detecting unit 411 has a band pass filter 425, a full wave rectifier 42, and a low pass filter 427.

In the first wobble amplitude detecting unit 411, the signal A input is band-restricted at the band pass filter 425 and rectified at the full wave rectifier 426 and then passed through the low pass filter 427 thereby to detect the amplitude of the signal A.

The second wobble amplitude detecting unit 412 detects the amplitude signal Dw of wobble on the photo detector section PD-D side (right side) from the output signal D of the photo detector section PD-D similar to the first wobble amplitude detecting unit 411. The configuration and operation of the second wobble amplitude detecting unit 412 are the same as the configuration of the first wobble amplitude detecting unit 411 mentioned before by referring to FIG. 10.

The first coefficient multiplier 423 multiplies the amplitude signal Aw of wobble of the photo detector section PD-A side (left side) found at the first wobble amplitude detecting unit 411 by the predetermined coefficient $K_A$ and outputs this to the first subtracter 413.

The second coefficient multiplier 424 multiplies the amplitude signal Dw of wobble of the photo detector section PD-D side (right side) found at the second wobble amplitude detecting unit 412 by the predetermined coefficient $K_D$ and outputs this to the first subtracter 413.

Figure 2:
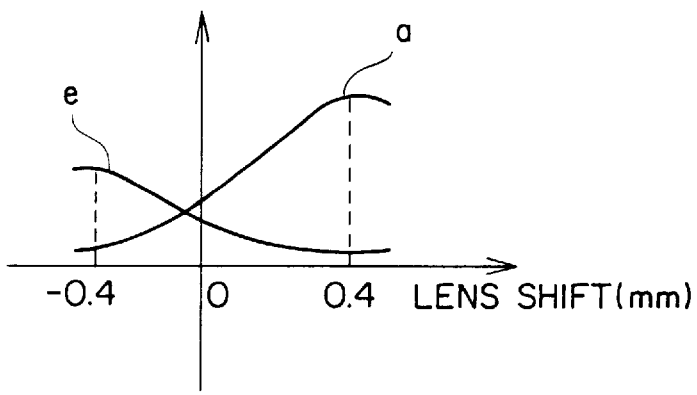
FIG. 2 is a graph of a lens shift dependency of the wobble component detected at the wobble amplitude detecting unit of the tracking error detecting circuit shown in FIG. 9.
Figure 3:
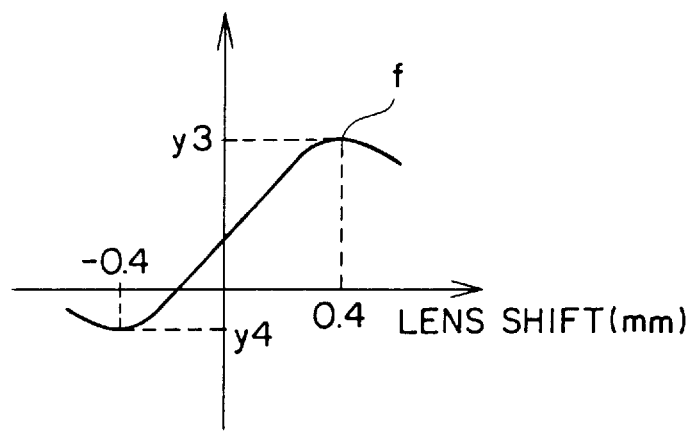
FIG. 3 is a graph of a lens shift dependency of the offset component detected in the related art tracking error detecting circuit.
Figure 12:
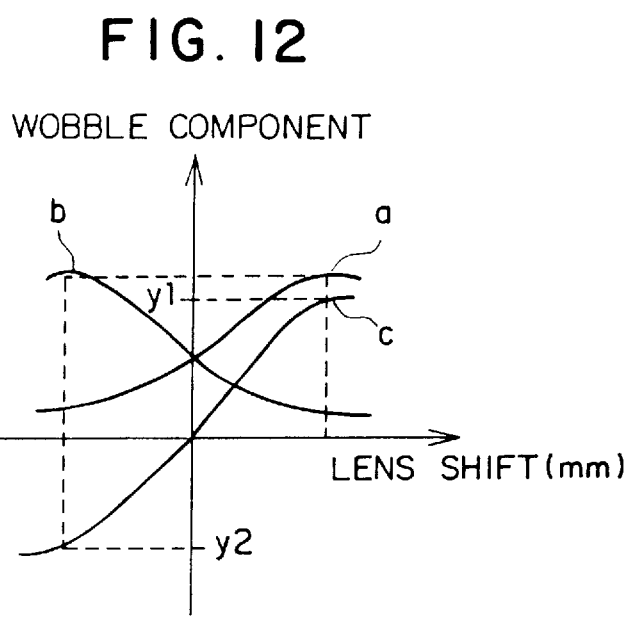
FIG. 12 is a graph of a lens shift dependency of an offset component detected at the tracking error detecting circuit shown in FIG. 9.

The coefficients $K_A$ and $K_D$ multiplied at the first coefficient multiplier 423 and the second coefficient multiplier 424 are determined so that the wobble component having a lens shift dependency as shown by for example curve a of FIG. 2 found at the first wobble amplitude detecting unit 411 and the wobble component having a lens shift dependency as shown by for example curve e of FIG. 2 found at the second wobble amplitude detecting unit 412 are corrected to the symmetrical lens shift dependencies about the lens shift 0 as shown by curves a and b in FIG. 12.

The first subtracter 413 finds the difference between the corrected amplitude component $K_A \times Aw$ found at the first coefficient multiplier 423 and the corrected amplitude component $K_D \times Dw$ found at the second coefficient multiplier 424 and outputs the difference to the first divider 416.

The second subtracter 414 finds the difference between the output signal A from the photo detector section PD-A and the output signal D from the photo detector section PD-D and outputs the difference A−D to the third wobble amplitude detecting unit 415.

The third wobble amplitude detecting unit 415 detects the amplitude signal (A−D)w of the wobble at the input push-pull signal A−D and outputs the same to the first divider 416. The configuration and operation of this third wobble amplitude detecting unit 415 are the same as the configuration and operation of the first wobble amplitude detecting unit 411 mentioned before.

The first divider 416 performs the division shown in the following Equation 5 by using the signal $(K_A \times Aw)−(K_D \times Dw)$ input from the first subtracter 413 as the dividend and the signal (A−D)w input from the third wobble amplitude detecting unit 415 as the divisor, finds the offset signal $PP_O$, and outputs this to the fourth subtracter 422.

$$PP_O = (K_A \times Aw) − (K_D \times Dw)/(A−D)w \qquad (5)$$

Further, the third subtracter 419 performs the subtraction of the output signal L corresponding to the amount of the full first order diffraction light and the output signal R corresponding to the amount of the full minus first order diffraction light as shown in the following Equation 6, finds the push-pull signal PP=L−R, and outputs the same to the second divider 420.

$$TE = PP/Ig − PP_O \qquad (6)$$

The second divider 420 performs the division by using the result of subtraction of the third subtracter 419 as the dividend and the output signal Ig corresponding to the input full light amount as the divisor and obtains the push-pull signal PP/Ig normalized by the full light amount.

Then, in the fourth divider 422, as shown in Equation 6, the offset value $PP_O$ found at the first divider 416 is subtracted from the normalized push-pull signal PP/Ig found at the second divider 420 to find the push-pull signal in which the offset is cancelled, that is, the signal TE corresponding the tracking error.

Next, an explanation will be made of the operation of such a tracking error detecting circuit 300.

When the recording medium is set, the rotation of the disc is immediately started under the control of the not illustrated control unit and the tracking servo is simultaneously applied.

First, the outputs of the left side photo detector sections PD-A and PD-B and the right side photo detector sections PD-C and PD-D are respectively added at the adder 301 and the adder 302 to generate the left side output signal L and the right side detection signal R. These are further added at the adder 303 and the signal Ig corresponding to the full light amount is generated.

The difference between the left side detection signal L and the right side detection signal R is found at the subtracter 419, the push-pull signal PP is generated, and further the result thereof is divided at the divider 420 by using the signal Ig as the divisor. Thus the tracking error signal before cancellation of offset is found.

Further, the amplitude components Aw and Dw of the wobble are respectively found from the signal A from the left outside photo detector section PD-A and the signal D from the right outside photo detector section PD-D at the first wobble amplitude detecting unit 411 and the second wobble amplitude detecting unit 412. The amplitude components Aw and Dw are multiplied by the coefficients $K_A$ and $K_D$, respectively, the dependency by the lens shift is corrected, and the difference of the corrected amplitude components, i.e. $(K_A \times Aw) - (K_D \times Dw)$ is found at the subtracter 413.

Further, the difference of the signal A and signal D is found at the subtracter 414, and the amplitude component (A-W)w of the wobble is found at the third wobble amplitude detecting unit 415 with respect to the result thereof, which is the push-pull signal.

Then, at the divider 416, the offset signal $PP_O = (K_A \times Aw) - (K_D \times Dw)/(A-D)w$ is found and output to the fourth subtracter 422.

Then, at the subtracter 422, the offset value found at the first divider 416 with respect to the normalized tracking error signal found at the divider 420 is cancelled and the tracking error TE in which the offset value is cancelled is generated.

Figure 1:
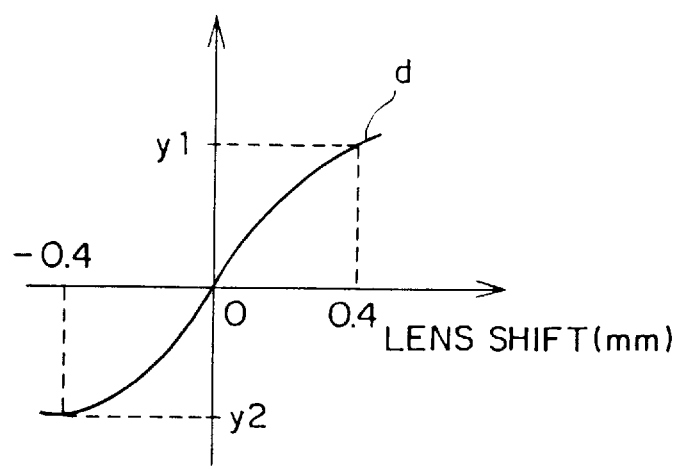
FIG. 1 is a graph of a lens shift dependency of the offset component produced in an actual push-pull signal.

In this way, in the tracking error detecting circuit of the present embodiment, as shown in curves a and e of FIG. 2, by respectively multiplying predetermined coefficients with the two wobble component signals having different dependencies with respect to the lens shift according to the direction thereof, these dependencies with respect to the lens shift are made equal as shown in curves a and b of FIG. 12. As a result, the calculated offset components are signals that become symmetrical about the lens shift 0 as shown in curve c of FIG. 12 and are signals substantially equal to the offset components actually produced in the push-pull signal shown in FIG. 1.

Namely, a correct offset component cancellation value not depending on the lens shift and substantially equal to the actual offset component is detected.

Note that, the present invention is not limited to the above second embodiment. Various modifications are possible.

For example, the actual configuration of the tracking error detecting circuit may be any configuration. Further, it is also possible to apply A/D conversion to the optical detection signal to obtain a digital signal and use a general purpose operational processing circuit such as a DSP (digital signal processor) to make the same perform the same operation as that by the circuit of the present embodiment to find the tracking error signal.

Further, the shape, arrangement, etc. of the divided sensor of the optical pick-up are not limited to the four-section photo detector PD shown in the present embodiment either. A divided sensor having any configuration structure can be adopted. Further, for example where two sets of four-section photo detectors PD are used, the two corresponding photo detector outputs may be added and A, B, C, and D may be formed again. Further, it is possible to combine the first embodiment and second embodiment of the present invention.

What is claimed is:

1. A tracking error detecting circuit for use in a wobbled groove optical recording medium system, wherein detecting the tracking error includes irradiating the optical recording medium with a spot beam and observing the reflections from the medium, the circuit comprising:

a plurality of light receiving sensors, said light receiving sensors being positioned according to the track direction of said recording medium so as to receive the reflections from said recording medium;

a push-pull signal detecting circuit for detecting a push-pull signal based on the relative amount of light received by each of said sensors;

a compulsory offset cancellation circuit for removing an input offset signal from said push-pull signal;

an offset component detecting circuit for detecting a DC offset component of said push-pull signal based on the amplitude of the wobbling component of said push-pull signal;

a cancellation signal detecting circuit for determining an offset cancellation signal for said push-pull signal by using a parameter determined in advance and based on said DC offset component;

a DC offset cancellation circuit for generating a tracking error signal by removing said offset cancellation signal from said push-pull signal; and a parameter determining means for determining said parameter used by said cancellation signal detecting circuit, said determination of said parameter being based on said DC offset component.

2. The tracking error detecting circuit as set forth in claim 1, wherein there are four said light receiving sensors and the area of said recording medium covered by each said sensor is defined according to one or more dividing lines which run parallel to the tracks of said recording medium.

3. The tracking error detecting circuit as set forth in claim 2, wherein said push-pull signal detecting circuit divides said four light receiving sensors into two sets of sensors which sandwich a tracked groove between them, and detects said push-pull signal based on the relative amount of reflected light received by said two sets of sensors.

4. The tracking error detecting circuit as set forth in claim 2, wherein the tracking error detecting circuit finds said tracking error signal TEw by the equation $$TEw = ((A+B)-(C+D))/(A+B+C+D) - Kw^*(Aw-Dw)/(A-D)w$$

where, the outputs of said four light receiving sensors are A, B, C and D, respectively, output A being the output of the sensor that is farthest from the center of the groove being tracked with respect to one side relative to the groove center, and output D being the output of the sensor that is farthest from the center of the groove being tracked with respect to the other side relative to the groove center;

the amplitude of the individual wobbling components corresponding to sensors A and D are Aw and Dw, respectively, the amplitude of the wobbling component corresponding to a combined signal from sensors A and D is (A−D)w, and said parameter is Kw.

5. The tracking error detecting circuit as set forth in claim 1, further comprising:

a second tracking error detecting circuit that generates a second tracking error signal in which said DC offset component is canceled based on a DC offset value at an instant when a tracking servo is turned on following an off-track state and tracking is to be performed on a wobbled groove track;

a third tracking error detecting circuit that generates a third tracking error signal in which said DC offset component is canceled based on the amplitude of a peak value output from said light receiving sensors, said third tracking error detecting circuit being operable when tracking is to be performed on a pit track; and a switching circuit for switching between said second and third tracking error detecting circuits based on the type of track to be tracked.

6. The tracking error detecting circuit as set forth in claim 5, wherein said second tracking error detecting circuit and said third tracking error detecting circuit are fabricated on a single integrated circuit.

7. The tracking error detecting circuit as set forth in claim 1, further comprising:

a pit tracking error detecting circuit that generates a pit tracking error signal in which said DC offset component is canceled based on the amplitude of a peak value output from said light receiving sensors, said pit tracking error detecting circuit being operable when tracking is to be performed on a pit track; and a switching circuit for selecting said pit tracking error detecting circuit when the type of track to be tracked is a pit track.

8. The tracking error detecting circuit as set forth in claim 7, wherein said pit tracking error detecting circuit is fabricated on a single integrated circuit.

9. A tracking error detecting circuit for use in a wobbled groove optical recording medium system, wherein detecting the tracking error includes irradiating the optical recording medium with a spot beam and observing the reflections from the medium, the circuit comprising:

a plurality of light receiving sensors, said light receiving sensors being positioned according to the track direction of said recording medium so as to receive the reflections from said recording medium;

a push-pull signal detecting circuit for detecting a push-pull signal based on the relative amount of light received by each of said sensors;

an offset component detecting circuit for detecting a DC offset component of said push-pull signal based on the amplitude of the wobbling component of said push-pull signal;

a cancellation signal detecting circuit for determining an offset cancellation signal for said push-pull signal by using parameters determined in advance and based on said DC offset component;

a DC offset cancellation circuit for generating a tracking error signal by removing said offset cancellation signal from said push-pull signal; and a setting means for setting the value of said parameters based on said DC offset component.

10. The tracking error detecting circuit as set forth in claim 9, wherein there are four said light receiving sensors and the area of said recording medium covered by each said sensor is defined according to one or more dividing lines which run parallel to the tracks of said recording medium.

11. The tracking error detecting circuit as set forth in claim 10, wherein said push-pull signal detecting circuit divides said four light receiving sensors into two sets of sensors which sandwich a tracked groove between them, and detects said push-pull signal based on the relative amount of reflected light received by said two sets of sensors.

12. The tracking error detecting circuit as set forth in claim 10, wherein the tracking error detecting circuit finds said tracking error signal TEw by the equation $$TEw=((A+B)-(C+D))/(A+B+C+D)-Kw*(Aw-Dw)/(A-D)w$$

where, the outputs of said four light receiving sensors are A, B, C and D, respectively, output A being the output of the sensor that is farthest from the center of the groove being tracked with respect to one side relative to the groove center, and output D being the output of the sensor that is farthest from the center of the groove being tracked with respect to the other side relative to the groove center;

the amplitude of the individual wobbling components corresponding to sensors A and D are Aw and Dw, respectively, the amplitude of the wobbling component corresponding to a combined signal from sensors A and D is (A−D)w, and Kw is one of said parameters.

13. A tracking error detecting means for use in a wobbled groove optical recording medium system, wherein detecting the tracking error includes irradiating the optical recording medium with a spot beam and observing the reflections from the medium, the tracking error detecting means comprising:

a detecting means for detecting light from two sides of a groove that is being tracked, said two sides being defined with respect to the center of said groove being tracked;

a push-pull signal detecting means for generating a push-pull signal based on the output of said detection means;

a wobbling amplitude component detecting circuit for detecting a wobbling amplitude component for the reflected light from each of said two sides of said groove being tracked;

an offset component detecting circuit for adjusting said wobbling amplitude components to generate corrected wobbling amplitude components, and for using said corrected wobbling amplitude components to detect a DC offset component of the light detected by said detecting means, wherein said corrected wobbling amplitude components are free of any dependency on the shift direction of said beam relative to said center of said groove being tracked; and an offset signal cancellation circuit for generating a tracking error signal by removing said DC offset component from said push-pull signal.

14. The tracking error detecting means as set forth in claim 13, wherein said offset component detecting circuit comprises:

a first amplitude component detecting circuit for detecting wobbling amplitude components Ew and Fw corresponding, respectively, to light reflected from a first side of said two sides, E, and to light reflected from a second side of said two sides, F;

a coefficient multiplying circuit for multiplying, respectively, Ew and Fw by predetermined coefficients Ke and Kf;

a first subtraction circuit for calculating the difference $(Ke*Ew)-(Kf*Fw)$;

a second subtraction circuit for calculating the difference $(E-F)$;

a second amplitude component detecting circuit for detecting a wobbling amplitude component, $(E-F)w$, of the signal $(E-F)$; and a division circuit for performing a division using $(Ke*Ew) -(Kf*Fw)$ found at said first subtraction circuit as the dividend and using $(E-F)w$ found at said second amplitude component detecting circuit as the divisor;

wherein said division results in a DC offset component, PPo, such that said DC offset component is defined by the equation $PPo=((Ke*Ew)-(Kf*Fw))/(E-F)w$.

16. A tracking error detecting circuit for use in a wobbled groove optical recording medium system, wherein detecting the tracking error includes irradiating the optical recording medium with a spot beam and observing the reflections from the medium, the circuit comprising:

four light receiving sensors, said light receiving sensors being positioned according to the track direction of said recording medium so as to receive the reflections from said recording medium, the area of said recording medium covered by each said sensor being defined according to one or more dividing lines which run parallel to the tracks of said recording medium;

a push-pull signal detecting circuit for detecting a push-pull signal based on the relative amount of light received by each of said sensors;

an offset component detecting circuit for detecting a DC offset component of said push-pull signal based on the amplitude of the wobbling component of said push-pull signal;

a cancellation signal detecting circuit for determining an offset cancellation signal for said push-pull signal by using parameters determined in advance and based on said DC offset component;

a DC offset cancellation circuit for generating a tracking error signal by removing said offset cancellation signal from said push-pull signal; and a setting means for setting the value of said parameters based on said DC offset component;

wherein said tracking error signal TEw is calculated using the equation $$TEw=((A+B)-(C+D))/(A+B+C+D)-Kw*(Aw-Dw)/(A-D)w$$

where, the outputs of said four light receiving sensors are A, B, C and D, respectively, output A being the output of the sensor that is farthest from the center of the groove being tracked with respect to one side relative to the groove center, and output D being the output of the sensor that is farthest from the center of the groove being tracked with respect to the other side relative to the groove center;

the amplitude of the individual wobbling components corresponding to sensors A and D are Aw and Dw, respectively, the amplitude of the wobbling component corresponding to a combined signal from sensors A and D is $(A-D)w$, and Kw is one of said parameters.

16. A tracking error detecting means for use in a wobbled groove optical recording medium system, wherein detecting the tracking error includes irradiating the optical recording medium with a spot beam and observing the reflections from the medium, the tracking error detecting means comprising:

a detecting means for detecting light from two sides of a groove that is being tracked, said two sides being defined with respect to the center of said groove being tracked;

a push-pull signal detecting means for generating a push-pull signal based on the output of said detection means;

a wobbling amplitude component detecting circuit for detecting a wobbling amplitude component for the reflected light from each of said two sides of said groove being tracked;

an offset component detecting circuit for adjusting said wobbling amplitude components to generate corrected wobbling amplitude components, and for using said corrected wobbling amplitude components to detect a DC offset component of the light detected by said detecting means, wherein said corrected wobbling amplitude components are free of any dependency on the shift direction of said beam relative to said center of said groove being tracked; said offset component detecting circuit including: a first amplitude component detecting circuit for detecting wobbling amplitude components Ew and Fw corresponding, respectively, to light reflected from a first side of said two sides, E, and from light reflected from a second side of said two sides, F; a coefficient multiplying circuit for multiplying, respectively, Ew and Fw by predetermined coefficients Ke and Kf; a first subtraction circuit for calculating the difference $(Ke*Ew)-(Kf*Fw)$; a second subtraction circuit for calculating the difference $(E-F)$; a second amplitude component detecting circuit for detecting a wobbling amplitude component, $(E-F)w$, of the signal $(E-F)$; and a division circuit for performing a division using $(Ke*Ew)-(Kf*Fw)$ found at said first subtraction circuit as the dividend and using $(E-F)w$ found at said second amplitude component detecting circuit as the divisor, wherein said division results in a DC offset component, PPo, such that said DC offset component is defined by the equation $PPo=((Ke*Ew)-(Kf*Fw))/(E-F)w$; and an offset signal cancellation circuit for generating a tracking error signal by removing said DC offset component from said push-pull signal.

* * * * *